United States Patent [19]

Hergenrother et al.

[11] 4,264,759
[45] Apr. 28, 1981

[54] POLYPHOSPHAZENE POLYMERS CONTAINING ALKOXY SUBSTITUTENTS CONTAINING A FULLY SUBSTITUTED CARBON IN THE BETA POSITION

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,105

[22] Filed: Sep. 8, 1978

[51] Int. Cl.³ ............... C08G 73/00; C08G 79/02
[52] U.S. Cl. ....................... 528/168; 528/210; 528/374; 528/399
[58] Field of Search ............. 528/168, 399, 374

[56] References Cited

U.S. PATENT DOCUMENTS

| | | |
|---|---|---|
| 3,370,020 | 2/1968 | Allcock et al. ............... 528/168 |
| 3,795,526 | 3/1974 | Bergeran ........................ 106/168 |
| 4,040,843 | 8/1977 | Franko-Filipasic ........... 106/15 FP |

*Primary Examiner*—Wilbert J. Briggs, Sr

[57] ABSTRACT

Polyphosphazene polymers are prepared which contain repeating units represented by the formulas:

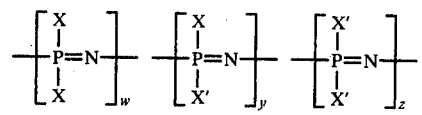

wherein X is represented by:

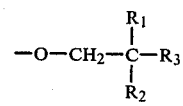

wherein $R_1$, and $R_2$ and $R_3$ are independently selected from the group consisting of substituted or unsubstituted alkyl and alkoxy radicals containing from 1 to 12 carbon atoms and aryl radicals; X' is chlorine or a substituted or unsubstituted alkoxy, aryloxy, amino or mercapto radical or mixture thereof, which are compatible with the alkoxy substituent containing a fully substituted carbon in the beta position; and $20 \leq (w+y+x) \leq 50,000$ per polymer.

The polymers of the invention can be utilized to form protective films, and can also be utilized in applications such as for molding, coatings, foams and the like.

6 Claims, No Drawings

POLYPHOSPHAZENE POLYMERS CONTAINING ALKOXY SUBSTITUTENTS CONTAINING A FULLY SUBSTITUTED CARBON IN THE BETA POSITION

BACKGROUND OF THE INVENTION

Polyphosphazene polymers containing repeating

units in which various substituted and unsubstituted alkoxy, aryloxy, amino and mercapto groups are attached to the phosphorus atom and their method of preparation are described in the prior art as illustrated in the publication "Nitrogen-Phosphorus Compounds", Academic Press, New York, New York, 1972, by H. R. Allcock and "Poly(Organophosphazenes)", Chemtech, Sept. 19, 1975, by H. R. Allcock and in such U.S. Pat. Nos. as 3,515,688; 3,702,833; 3,856,712; 3,974,242; and 4,042,561, the disclosures of which are herein incorporated by reference.

However, none of the aforementioned publications and patents, or for that matter, none of the prior art of which applicants are aware, discloses or suggests polyphosphazene copolymers containing alkoxide substituents containing a fully substituted carbon in the beta position which is attached to the phosphorus atom or methods of preparing such polymers.

SUMMARY OF THE INVENTION

This invention relates to polyphosphazene polymers containing repeating

units in the polymer chain in which alkoxy substituents containing a fully substituted carbon in the beta position, such as neo-pentyl alkoxy groups, are attached to the phosphorus atom. More particularly, the invention relates to polyphosphazene polymers having substituents attached to phosphorus atoms, which are derived from alcohols containing a fully substituted carbon in the beta position, and to methods of preparing such polymers. Any other substituent groups which are compatible with the fully substituted beta-carbon containing alkoxy substituents such as alkoxy, aryloxy, mercapto or amino groups, and are known in the polyphosphazene state of the art may be substituted onto the polyphosphazene in addition to the alkoxy substituents containing a fully substituted carbon in the beta position in order to form copolymers. These substituents may be substituted onto the polyphosphazene by the method disclosed in the present invention or by prior art methods.

DETAILED DESCRIPTION OF THE INVENTION

The polymers, of the invention contain repeating units represented by the formulas:

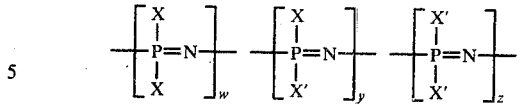

wherein X is represented by:

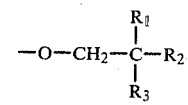

wherein $R_1$, $R_2$ and $R_3$ are selected from the group consisting of substituted and unsubstituted alkyl and alkoxy radicals containing from 1 to 12 carbon and aryl radicals; X' is chlorine or any substituted or unsubstituted alkoxy, aryloxy, amino or mercapto substitution group or a mixture thereof, which is known in the state of the art in poly(phosphazene) technology and which is compatible with alkoxy substituents having a fully substituted carbon in the beta position. The polymer can contain from 20 to 50,000 of such units such that $20 \leq (w+y+z) \leq 50,000$ and $(y+z) > 0$. The substitution on the various substituted groups may be any "non-reactive" substituent, i.e., a substituent which is non-reactive with the various materials present during polymer formation. Suitable substituents include chlorine, bromine, nitro, cyano, phenoxy, and alkoxy and the like.

The presence of a fully substituted carbon in the beta position of an alkoxy substituent on a phosphazene polymer imparts the properties of heat stability and hydrolytic stability to the polymer, as well as protects the backbone of the polymer against attack, due to the size of the beta-carbon atom substitution groups and due to the absence of hydrogen on the beta-carbon.

In the polymer units represented by the above formulas, all X substituent groups can be the same or they can be mixed and all X' substituent groups can be the same or mixed. In the mixtures, the X substituent groups can be mixtures of different alkoxy groups having a fully substituted carbon in the beta position and the X' substituent groups can be mixtures of alkoxy, aryloxy, amino and mercaptan groups.

The phosphazene polymers of the invention can be represented by the formula:

[NP $(X)_a(X')_b]_n$ wherein n is from 20 to 50,000 and $a+b=2$ and a and b are greater than zero. The percentage of X in $(X+X')$ must be at least one mole percent to receive the benefit of the fully substituted carbon containing alkoxy substituent with respect to molding, foaming, and coating applications. Due to the size of this substitution group, practically only about 60 percent of the possible substitution sites can be substituted with the alkoxy groups having a fully substituted carbon in the beta position.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520;

4,061,606; 4,073,824; 4,073,825; and 4,076,658 which are hereby incorporated by reference and include —OCH═CH and OR₃CF═CF₂, as well as similar groups which contain unsaturation. Generally, when present, the moieties containing crosslinking functionality are usefully present in an amount between about 0.1 mole % to about 50 mole %, and usually between about 0.5 mole % and about 10 mole % based on the replaceable chlorine in the starting poly(dichlorophosphazene).

The polymers can be used to prepare protective films and can be utilized in applications such as molding, foaming, coatings, and the like.

METHODS OF PREPARATION

The polymers of the invention are prepared by reacting a poly(dichlorophosphazene) having the formula —(NPCl₂)$_n$—, in which n is from 20 to 50,000, with either an active hydrogen containing fully substituted beta-carbon containing alcohol, or a mixture of an active hydrogen containing fully substituted beta-carbon containing alcohol with any compound, known in the state of the art, which is reactive with the poly(dichlorophosphazene) to form a substitution group on a phosphorus atom in the poly(dichlorophosphazene), in the presence of a tertiary amine. Examples of such compounds are discussed in the section entitled "Additional Reactive Compounds" below.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171 and 4,055,520 and the aforementioned publications of H. R. Allcock, the disclosures of which are incorporated herein by reference.

These polymers have the general formula —(NPCl₂)$_n$—, in which n may range from 20 to 50,000 or more. As described in the aforementioned references, the polymers are in general prepared by the thermal polymerization of cyclic oligomers having the formula (NPCl₂)$_m$ in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about 10⁻¹ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. THE ACTIVE HYDROGEN-CONTAINING ALCOHOL WHICH CONTAINS A FULLY SUBSTITUTED CARBON IN THE BETA POSITION

Active hydrogen containing alcohols which are used to prepare the polymers of the present invention are represented by the following structural formula:

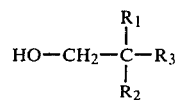

wherein R₁, R₂ and R₃ are selected from the group consisting of substituted and unsubstituted alkyl radicals containing from 1 to 12 carbon atoms, substituted and unsubstituted alkoxy radicals containing from 1 to 12 carbon atoms, and substituted and unsubstituted aryl groups.

Illustrative examples of alkyl alcohols containing a fully substituted carbon in the beta position include 2,2-dimethylpropanol (neopentyl alcohol); 2,2-dimethylbutanol; 2,2-diethylbutanol; 2-methyl-2-ethylbutanol; 2,2-dimethylpentanol; 2,2-dimethylhexanol; 2-methyl-2-ethylhexanol; 2,2-dipentylhexanol; 2,2-dimethylheptanol; 2,2-dimethyloctanol; 2,2-dimethyldecanol and the like.

Illustrative examples of alkoxy substituted alcohols include: 2,2-dimethoxypropanol; 2-methoxy-2-methylpropanol; 2,2-dimethoxybutanol; 2-ethoxy-2-methylbutanol; 2,2-dimethoxypentanol; 2-methoxy-2-ethoxypentanol; 2,2-dipentoxypentanol; 2,2-dimethoxyhexanol; 2,2-dimethoxydecanol and the like.

Illustrative examples of aryl containing alcohols which can be used to form the polymers of the invention include 2,2,2-triphenylethanol; 2,2-diphenyl-2-methoxyethanol; 2,2-diphenyl-2-propanol; 2-phenyl-2-methoxypropanol; 2,2-diphenylbutanol; 2,2-diphenylhexanol; 2,2-diphenyldecanol and the like.

The preferred fully substituted carbon containing alcohol for preparing the polymers of the invention is 2,2-dimethylpropanol. Polyphosphazene polymers which are prepared using 2,2-dimethylpropanol to form 1 to 60 percent of the possible substitution groups are thermoplastic and range from rubbery to rigid in texture depending on the nature of the comonomer, the mode of addition and the proportion of components.

III. ADDITIONAL REACTIVE COMPOUNDS

As indicated heretofore, the polyphosphazene copolymers of the invention, in addition to the alkoxy substituent groups having a fully substituted carbon in the beta position, contain chlorine or substituted or unsubstituted alkoxy, aryloxy, amino or mercapto groups or mixtures thereof.

However, due to the bulk of the alkoxy substituent containing a fully substituted beta-carbon atom, only straight chain alcohols, amines and mercaptans as well as only highly reactive aryl alcohols can be employed to form the copolymers of the invention.

Preferred substituent groups represented by X' for use in these copolymer are:

Alkoxy groups (substituted or unsubstituted) derived from aliphatic alcohols having from 1 to 20 carbon atoms such as methanol, ethanol, propanol, n-butanol, hexanol, dodecanol, and the like; fluoroalcohols, especially those represented by the formula Z(CF₂)$_n$CH₂OH in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols can be employed.

Aryloxy groups derived from highly reactive aromatic alcohols including, among others, para-nitrophenol and para-cyanophenol.

Amino groups derived from any of the primary straight chain amino compounds heretofore employed in the polyphosphazene polymer art. Thus, the amino groups can be derived from aliphatic primary straight chain amines such as methylamine, ethylamine, and the like.

Mercapto groups derived from any of the primary straight chain mercaptan compounds heretofore employed in the polyphosphazene polymer art. Representative of suitable mercaptan compounds are methyl mercaptan and its homologs ethyl, propyl, butyl, pentyl, hexyl mercaptans, and the like.

IV. THE TERTIARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

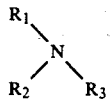

wherein $R_1$, $R_2$ and $R_3$ can each be alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine, n-methyl morpholine; N-methyl pyrrole; 1,4-diaza-bicyclo (2.2.2) octane (DABCO), and dipiperidyl ethane.

As indicated above, the polymers of the present invention are prepared by reacting the poly(dichlorophosphazene) polymer and the active hydrogen-containing alcohol containing a fully substituted carbon in the beta position, in the presence of a tertiary amine. The compounds listed in the group of "Additional Reactive Compounds" which can be substituted onto the poly(dichlorophosphazene) in the presence of a tertiary amine, can be employed in the reaction mix.

Due to the size of the substituent groups formed from an alcohol containing a fully substituted carbon in the beta position it is preferred that the alcohol be reacted with the poly(dichlorophosphazene) before the other substitutions are performed to prevent the inhibition of the substitution of the larger bulky groups by the pre-substitution of the other substituent groups.

Upon substantial partial substitution of the poly(dichlorophosphazene) polymer with the alkoxy substituents having a fully substituted carbon in the beta position, e.g., 40 to 60 percent of the possible substitution sites, a polychloroalkoxy-phosphazene polymer having a protected backbone is formed. Further substitution need not be performed and is necessary only to impart other characteristics to the polymer. When less than 40 percent of the possible substitution sites of the poly(dichlorophosphazene) are initially substituted, e.g., 1 to 40 percent, additional substituent groups should be added to the polymer in an amount at least sufficient to replace enough of the remaining chlorine on the backbone to form a hydrolytically stable polymer.

The specific reaction conditions and proportion of ingredients employed in preparing these polymers can vary somewhat depending on factors such as the reactivity of the specific containing a fully substituted carbon in the beta position utilized, the particular tertiary amine employed, and the degree of substitution desired in the finished polymer. In general, reaction temperatures can range from about 25° C., to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure a substantial conversion of the chlorine atoms on the backbone of the starting polymer to the corresponding ester of the active hydrogen-containing compound and form a substantially hydrolytically stable polymer.

The above reaction is ordinarily carried out in the presence of a solvent. The solvent employed in the reaction should be a solvent for both the poly(dichlorophosphazene) polymer, the active hydrogen-containing alcohol compound containing a fully substituted carbon in the beta position and the tertiary amine. Examples of suitable solvents which can be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture materials can be employed.

In addition, the materials in the reaction zone should be reasonably free of water. The prevention of substantial amounts of water in the reaction system is necessary in order to inhibit the undesirable sidereaction of the available chlorine atoms in the chloropolymer. Preferably, the reaction mixture should contain less than about 0.01% water.

When it is desired that substantially all substituent groups on the polymer backbone be other than chlorine, the combined amount of alcohol containing a fully substituted carbon in the beta position and the alkanol, aryl alcohol, amine or mercaptan and mixtures thereof, which are employed in the process should be at least molecularly equivalent to the number of available chlorine atoms in the starting polymer. However, it is preferred that an excess of such compounds be employed in order to insure substantially complete reaction of all the available chlorine atoms.

While the fully substituted beta-carbon containing alkoxy substituted poly(phosphazene) polymers of the present invention have been prepared in the above-identified manner, that is, in the presence of a tertiary amine, alternative methods of preparation are available. The prior art methods of poly(dichlorophosphazene) substitution such as by reaction with sodium alkoxide, as demonstrated in U.S. Pat. No. 3,370,020 to Allcock et al, may be used to substitute both the fully substituted beta-carbon containing alkoxy substituent groups and the substituents derived from the compounds listed in the list of additional reactive compounds other than chlorine. It is again preferred to initially substitute the derivatives of the alcohols containing a fully substituted carbon in the beta position before the other substitutions are performed, to prevent the inhibition of the substitution of the former groups by the latter groups.

The following examples are submitted for the purpose of further illustrating the nature of the present invention and are not intended as a limitation on the scope thereof. Parts and percentages referred to in the examples and throughout the specification are by weight unless otherwise indicated. All temperatures are degrees centigrade unless otherwise specified.

EXAMPLE 1

Preparation of $+((CH_3)_3CCH_2O)(CF_3CH_2O)PN+$ Polymer

A 10 oz. bottle was charged with 3.88 gms of neopentyl alcohol (44 millimoles), 12.3 cc of triethylamine (88 millimoles), 56.4 gms of a 8.18% tetrahydrofuran solution of poly(dichlorophosphazene) (39.8 millimoles) having a degree of polymerization of 2400. After 20 hours at 80° C., 3.2 cc of trifluoroethanol (44 millimoles) was added to the bottle followed by further heating at 80° C. for 20 hours. The material in the bottle was then subjected to an infrared spectroscopy which determined the material to have a strong band at 575 cm$^{-1}$ with a slight tail to 660 cm$^{-1}$. The material in the reactor was coagulated in hexane to yield 5.9 gms of a tan, moldable solid and subsequently another 0.9 gms was obtained by water washing the salt residue from the polymer formation reaction.

EXAMPLE 2

Preparation of $[((CH_3)_3CCH_2O)(p-NO_2C_6H_5O)PN]$ Polymer

To a 10 oz bottle was added 3.88 gms (44 millimoles) of neopentyl alcohol, 100 cc of alcohol free dry chloroform, 12.3 cc (88 millimoles) of triethylamine, and 63.6 gms (39.9 millimoles) of a 7.26% CHCl$_3$ solution of poly(dichlorophosphazene). This solution was heated for 20 hours at 120° C. At the end of this time a solution of 6.12 gms (44 millimoles) of p-nitrophenol in 50 cc of dry chloroform was added and the bottle was again heated for 20 hours at 120° C. The solid was isolated by decanting and washing with methanol to give 11.6 gms of a brown plastic that could be pressed into a smooth film at 225° C. The chloroform solution gave an additional 0.55 gm of polymer by coagulation in methanol.

We claim:

1. A method of preparing polyphosphazene polymers containing units represented by the formulas:

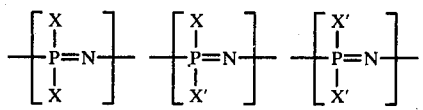

wherein X is —OCH$_2$CR$_1$R$_2$R$_3$ in which R$_1$, R$_2$ and R$_3$ are independently selected from the group consisting of alkyl and alkoxy radicals containing from 1 to 12 carbon atoms and aryl radicals, wherein X' is selected from the group consisting of chlorine, substituted and unsubstituted alkoxy, aryloxy, amino, mercapto radicals and mixtures thereof; said method comprising reacting a poly(dichlorophosphazene) polymer having the formula —(NPCl$_2$)$_n$—, wherein n is from 20 to 50,000 with an alcohol or mixture of alcohols containing a fully substituted carbon in the beta position which provides the desired X substituent upon substitution onto the phosphazene polymer followed by reacting the resulting partially substituted phosphazene polymer with an alkanol, aryl alcohol, amine, mercaptan or a mixture thereof, the reactions taking place in the presence of a tertiary amine or the respective alcohols being reacted in the form of their alkoxides, thereby forming the polyphosphazene represented by the formulas.

2. The method of claim 1 wherein X is derived from 2,2-dimethyl propanol.

3. The method of claim 1 wherein X is derived from 2,2-dimethyl propanol and X' is derived from trifluoroethanol.

4. The method of claim 1 wherein X is derived from 2,2-dimethyl propanol and X' is derived from p-nitrophenol.

5. The method of claims 1, 2 or 3 wherein the reactions are conducted in the presence of a tertiary amine.

6. The method as in claim 1 wherein between 40 to 60 percent of possible substituents (X+X') are X.

* * * * *

UNITED STATES PATENT AND TRADEMARK OFFICE
CERTIFICATE OF CORRECTION

PATENT NO. : 4,264,759
DATED : April 28, 1981
INVENTOR(S) : William L. Hergenrother & Adel F. Halasa It is certified that error appears in the above-identified patent and that said Letters Patent are hereby corrected as shown below:

In the title

"Substitutents" should read -- Substituents --

Col. 7, line 26

"660" should read -- 600 --

Signed and Sealed this

Twenty-first Day of July 1981

[SEAL]

Attest:

GERALD J. MOSSINGHOFF

Attesting Officer

Commissioner of Patents and Trademarks